(12) United States Patent
Yu

(10) Patent No.: US 10,372,187 B2
(45) Date of Patent: *Aug. 6, 2019

(54) METHODS OF CONSTRAINING PERFORMANCE OF A MOBILE DEVICE USING AN APPLICATION PROCESSOR, AND RELATED MOBILE DEVICES

(71) Applicant: Samsung Electronics Co., Ltd., Suwon-si, Gyeonggi-do (KR)

(72) Inventor: Ki-Soo Yu, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/012,973

(22) Filed: Jun. 20, 2018

(65) Prior Publication Data

US 2018/0299941 A1  Oct. 18, 2018

Related U.S. Application Data

(63) Continuation of application No. 14/616,203, filed on Feb. 6, 2015, now Pat. No. 10,007,318.

(30) Foreign Application Priority Data

Mar. 5, 2014  (KR) .................. 10-2014-0026261

(51) Int. Cl.
*G06F 1/324* (2019.01)
*G06F 1/3206* (2019.01)
(Continued)

(52) U.S. Cl.
CPC ............ *G06F 1/3206* (2013.01); *G06F 1/324* (2013.01); *G06F 1/3212* (2013.01);
(Continued)

(58) Field of Classification Search
CPC ...... G06F 1/3206; G06F 1/3212; G06F 1/324; G06F 1/3296; Y02D 10/174; Y02D 10/126; Y02D 10/172
See application file for complete search history.

(56) References Cited

U.S. PATENT DOCUMENTS 8,059,570 B2   11/2011   Albert et al.
8,121,655 B2   2/2012   Harris et al.
(Continued)

FOREIGN PATENT DOCUMENTS

JP    2009-130860 A    6/2009
KR    2013-0007258 A    1/2013

*Primary Examiner* — Mehmood B. Khan
(74) *Attorney, Agent, or Firm* — Harness, Dickey & Pierce, P.L.C.

(57) ABSTRACT

Methods of operating a mobile device are provided. A method of operating a mobile device includes calculating a mean power consumption with respect to a time duration, using a measured power consumption or using an estimated power consumption. The method includes comparing a performance constraint standard with the mean power consumption. Moreover, the method includes constraining performance of the mobile device, using an application processor of the mobile device, in response to determining that the mean power consumption exceeds the performance constraint standard. Related mobile devices are also provided.

20 Claims, 12 Drawing Sheets

(51) Int. Cl.
*G06F 1/3212* (2019.01)
*G06F 1/3296* (2019.01)
(52) U.S. Cl.
CPC .......... *G06F 1/3296* (2013.01); *Y02D 10/126* (2018.01); *Y02D 10/172* (2018.01); *Y02D 10/174* (2018.01)

(56) References Cited

U.S. PATENT DOCUMENTS

| | | | |
|---|---|---|---|
| 8,131,324 B2 | 3/2012 | Hossain et al. | |
| 8,156,363 B2 | 4/2012 | Kobayashi et al. | |
| 9,158,366 B1* | 10/2015 | Jenkins | G06F 1/3268 |
| 2003/0125900 A1* | 7/2003 | Orenstien | G06F 1/3203 |
| | | | 702/132 |
| 2007/0049133 A1* | 3/2007 | Conroy | G06F 1/26 |
| | | | 439/894 |
| 2007/0050647 A1* | 3/2007 | Conroy | G06F 1/3203 |
| | | | 713/300 |
| 2009/0222223 A1* | 9/2009 | Walters | G01R 31/44 |
| | | | 702/58 |
| 2009/0276651 A1* | 11/2009 | Conroy | G06F 1/26 |
| | | | 713/340 |
| 2012/0016528 A1* | 1/2012 | Raman | G06F 9/5094 |
| | | | 700/291 |
| 2012/0210153 A1* | 8/2012 | Kamijima | G06F 1/3206 |
| | | | 713/323 |
| 2012/0210325 A1* | 8/2012 | de Lind van Wijngaarden | H04W 52/0258 |
| | | | 718/103 |
| 2012/0293477 A1 | 11/2012 | Ni | |
| 2013/0086406 A1 | 4/2013 | Matton et al. | |
| 2013/0089015 A1 | 4/2013 | Choong | |
| 2013/0173946 A1* | 7/2013 | Rotem | G06F 1/3206 |
| | | | 713/340 |
| 2013/0205146 A1* | 8/2013 | Zhang | G06F 1/3268 |
| | | | 713/322 |
| 2014/0024416 A1* | 1/2014 | Xie | H04W 52/0261 |
| | | | 455/574 |
| 2014/0082383 A1* | 3/2014 | De Cesare | G06F 1/3206 |
| | | | 713/320 |
| 2014/0082387 A1* | 3/2014 | Wei | G06F 1/3287 |
| | | | 713/322 |
| 2014/0232642 A1* | 8/2014 | Lefebvre | G06F 3/017 |
| | | | 345/156 |
| 2015/0307952 A1 | 10/2015 | Saville | |
| 2015/0309752 A1* | 10/2015 | Ellis | G06F 3/0625 |
| | | | 711/103 |
| 2016/0044151 A1* | 2/2016 | Shoemaker | H04M 19/04 |
| | | | 455/556.1 |
| 2017/0070793 A1* | 3/2017 | Liu | H04Q 9/00 |

* cited by examiner

FIG. 8

| SETTING | SHORT-TERM MAX MEAN POWER | MID-TERM MAX MEAN POWER | LONG-TERM MAX MEAN POWER |
|---|---|---|---|
| PERFORMANCE MODE | 6.0 W | 2.5 W | 2.0 W |
| MIDDLE MODE | 5.0 W | 2.0 W | 1.0 W |
| ECO MODE | 4.0 W | 1.8 W | 0.8 W |

| REMAINING BATTERY CHARGE | SHORT-TERM THRESHOLD | MID-TERM THRESHOLD | LONG-TERM THRESHOLD |
|---|---|---|---|
| 100% | 6.0 W | 2.5 W | 2.0 W |
| 50% | 5.0 W | 2.0 W | 1.0 W |
| 30% | 4.0 W | 1.8 W | 0.8 W |

METHODS OF CONSTRAINING PERFORMANCE OF A MOBILE DEVICE USING AN APPLICATION PROCESSOR, AND RELATED MOBILE DEVICES

CROSS-REFERENCE TO RELATED APPLICATION

This is a continuation of U.S. application Ser. No. 14/616,203, filed on Feb. 6, 2015, which claims priority under 35 U.S.C. § 119 to Korean Patent Application No. 10-2014-0026261, filed on Mar. 5, 2014, the entire contents of which are hereby incorporated herein by reference in their entirety.

BACKGROUND

The present disclosure relates to power consumption of mobile devices. Due to technology that tends to seek/benefit from environmentally-friendly and low-power characteristics, methods for reducing power consumption of computing device have been suggested. For example, low power consumption may be a performance factor with regard to a capacity of a battery and an operating time of a device in a mobile device.

To save power, an application processor may constrain performance of the application processor using low-power techniques such as dynamic voltage & frequency scaling (DVFS). Further, the application processor may perform power-saving of a battery by lowering power consumption of the mobile device using a lowered screen brightness or turning off haptic feedback.

SUMMARY

According to various embodiments of present inventive concepts, a method of operating a mobile device may include measuring power consumption in real-time, using a current meter to provide a measured power consumption, or estimating the power consumption in real-time, to provide an estimated power consumption. The method may include calculating a mean power consumption with respect to a time duration, using the measured power consumption or using the estimated power consumption. The method may include comparing a performance constraint standard value with the mean power consumption. Moreover, the method may include constraining performance of the mobile device, using an application processor of the mobile device, in response to determining that the mean power consumption exceeds the performance constraint standard value.

In various embodiments, calculating the mean power consumption with respect to the time duration may include calculating a first mean power consumption with respect to (e.g., of, during) a first time duration, and calculating a second mean power consumption with respect to (e.g., of, during) a second time duration. The first time duration may be shorter than the second time duration. Moreover, comparing the performance constraint standard value with the mean power consumption may include comparing a first performance constraint standard value with the first mean power consumption and comparing a second performance constraint standard value with the second mean power consumption. The first performance constraint standard value may be higher than the second performance constraint standard value.

According to various embodiments, constraining the performance of the mobile device may include controlling at least one of an amount of current provided from a battery, an operating frequency, and a brightness of a display in the mobile device, in response to determining that the mean power consumption exceeds the performance constraint standard value. Moreover, the method may include adjusting (e.g., increasing or decreasing) the performance constraint standard value in response to a charge state of the battery.

In various embodiments, the method may include determining whether the mobile device includes the current meter. Measuring the power consumption may include measuring the power consumption in real-time, using the current meter, to provide the measured power consumption, in response to determining that the mobile device includes the current meter. Estimating the power consumption may include estimating the power consumption in real-time, to provide the estimated power consumption, in response to determining that the mobile device does not include the current meter. Moreover, estimating the power consumption in real-time may include estimating the power consumption using at least one of an operating frequency, an operating voltage, and a capacitance of a load of the mobile device.

A mobile device, according to various embodiments, may include processing circuitry (e.g., a Power Management Integrated Circuit (PMIC), a current meter, and/or an application processor). The processing circuitry may be configured to calculate a mean power consumption with respect to a time duration, using a measured power consumption or an estimated power consumption. The processing circuitry may be configured to compare the mean power consumption with a performance constraint standard value. Moreover, the processing circuitry may be configured to constrain performance of the mobile device in response to determining that the mean power consumption exceeds the performance constraint standard value.

In various embodiments, the processing circuitry may be configured to calculate a first mean power consumption with respect to a first time duration and to calculate a second mean power consumption with respect to a second time duration. The first time duration may be shorter than the second time duration. Moreover, the processing circuitry may be configured to compare the first mean power consumption with a first performance constraint standard value and to compare the second mean power consumption with a second performance constraint standard value. The first performance constraint standard value may be higher than the second performance constraint standard value.

According to various embodiments, the mobile device may include a display device (e.g., a display screen) and a battery. The processing circuitry may include an application processor that is configured to control (e.g., limit/reduce) at least one of (a) an amount of current provided from the battery, (b) an operating frequency of the mobile device, and (c) a brightness of the display device, in response to determining that the mean power consumption exceeds the performance constraint standard value. Moreover, in some embodiments, the application processor may be configured to adjust (e.g., increase or decrease) the performance constraint standard value in response to a charge state of the battery.

In various embodiments, the mobile device may include a current meter that is configured to measure the power consumption in real time, to provide the measured power consumption. Alternatively, the processing circuitry may be configured to estimate the power consumption in real-time, to provide the estimated power consumption. Moreover, the processing circuitry may be configured to estimate the power consumption using at least one of (i) an operating frequency, (ii) an operating voltage, and (iii) a capacitance of a load of the mobile device.

A method of operating a mobile device, according to various embodiments, may include determining a first mean power consumption of the mobile device with respect to a first time duration. The method may include determining a second mean power consumption of the mobile device with respect to a second time duration. The method may include comparing the first mean power consumption with a first performance constraint standard value. The method may include comparing the second mean power consumption with a second performance constraint standard value. Moreover, the method may include non-uniformly constraining performance of the mobile device, using an application processor of the mobile device, with respect to time in a power-saving mode (e.g., non-uniformly limiting or restricting the performance within a period of time when the mobile device is in a power-saving mode), in response to determining that at least one of the first mean power consumption exceeds the first performance constraint standard value and that the second mean power consumption exceeds the second performance constraint standard value.

In various embodiments, the first time duration may be a shorter time duration than the second time duration, and the first performance constraint standard value may correspond to a first amount of power that is higher than a second amount of power to which the second performance constraint standard value corresponds. Moreover, non-uniformly constraining the performance of the mobile device may include constraining short-term power consumption of the mobile device using the first performance constraint standard value that corresponds to the higher first amount of power, and constraining mid-term or long-term power consumption of the mobile device using the second performance constraint standard value.

According to various embodiments, non-uniformly constraining the performance of the mobile device may include constraining the short-term power consumption of the mobile device below the first performance constraint standard value that corresponds to the higher first amount of power, and constraining the mid-term or long-term power consumption of the mobile device below the second performance constraint standard value.

In various embodiments, non-uniformly constraining the performance of the mobile device may include controlling (e.g., limiting/reducing) at least one of an amount of current provided from (a) a battery of the mobile device, (b) an operating frequency of the mobile device, (c) haptic feedback of the mobile device, and/or (d) a brightness of a display of the mobile device, in response to determining that at least one of the first mean power consumption exceeds the first performance constraint standard value and that the second mean power consumption exceeds the second performance constraint standard value and/or in response to a charge state of the battery.

According to various embodiments, non-uniformly constraining the performance of the mobile device may include increasing or decreasing the first and second performance constraint standard values in response to a selection by a user of the mobile device of a degree of power-saving (e.g., a degree of power-saving vs. performance-saving) within the power-saving mode.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

FIG. 8 is a table illustrating a performance constraint standard according to the third option OP3 shown in FIG. 7A to 7C.

DETAILED DESCRIPTION

Figure 1:
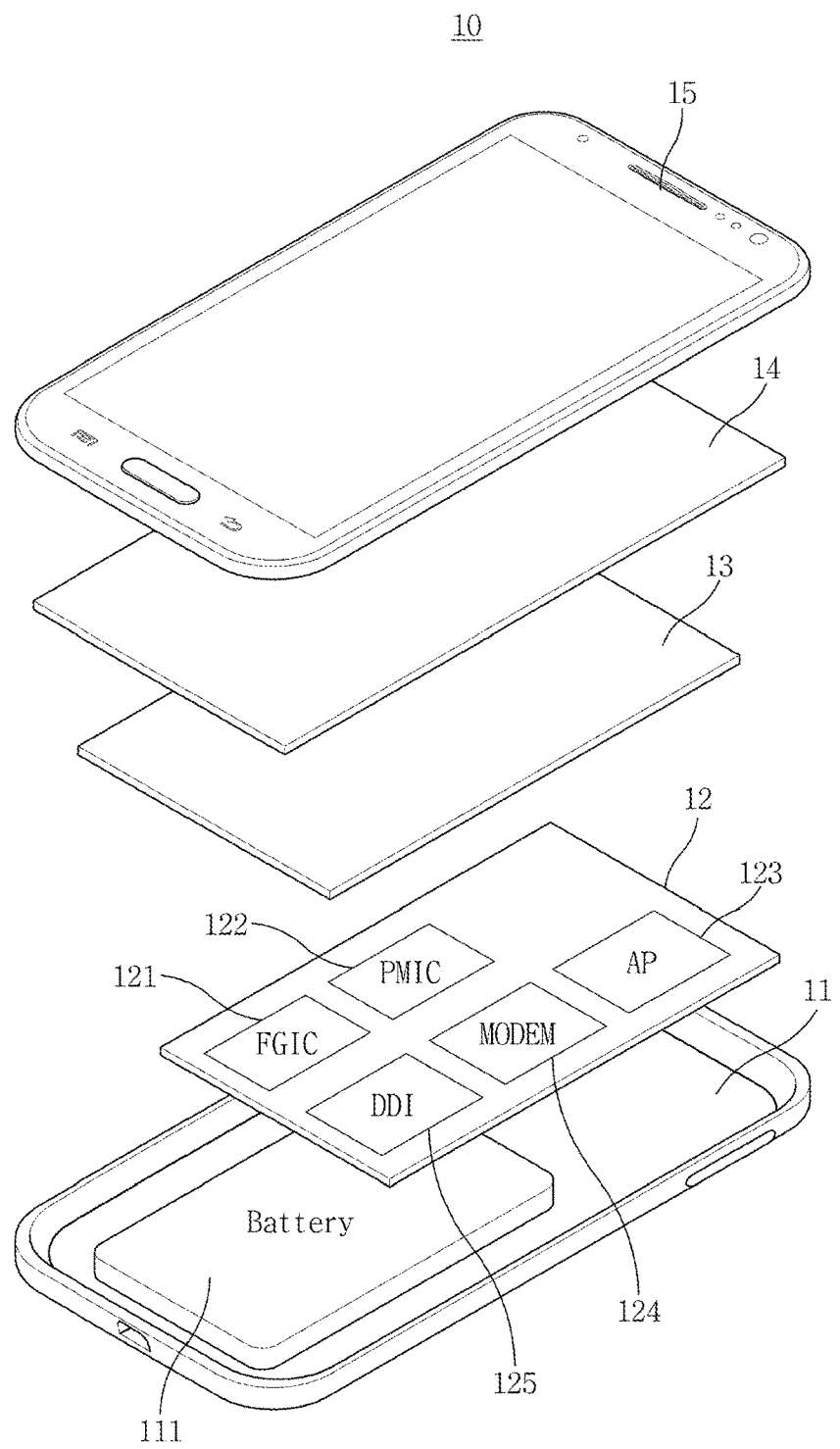
FIG. 1 is an exploded perspective view of a general mobile device, according to various embodiments of present inventive concepts.

Example embodiments are described below with reference to the accompanying drawings. Many different forms and embodiments are possible without deviating from the spirit and teachings of this disclosure and so the disclosure should not be construed as limited to the example embodiments set forth herein. Rather, these example embodiments are provided so that this disclosure will be thorough and complete, and will convey the scope of the disclosure to those skilled in the art. In the drawings, the sizes and relative sizes of layers and regions may be exaggerated for clarity. Like reference numbers refer to like elements throughout the description.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein may be interpreted accordingly.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Meanwhile, when it is possible to implement any embodiment in any other way, a function or an operation specified in a specific block may be performed differently from a flow specified in a flowchart. For example, two consecutive blocks may actually perform the function or the operation simultaneously, and the two blocks may perform the function or the operation conversely according to a related operation or function.

Various embodiments of present inventive concepts are described below with reference to accompanying drawings.

FIG. 1 is an exploded perspective view of a general mobile device, according to various embodiments of present inventive concepts. Referring to FIG. 1, the mobile device 10 may include a housing 11, a printed circuit board (PCB) 12, a display module (DM) 13, a touch sensing panel (TSP) 14, and a window cover glass 15.

A smartphone is illustrated as an example of the mobile device 10. However, the mobile device 10 in accordance with various embodiments of present inventive concepts is not limited to the smartphone and may be any of various information-providing devices, such as a navigation device, a computer monitor, a tablet computer (e.g., a tablet personal computer (PC)), etc.

The housing 11 may accommodate internal components of the mobile device 10 (e.g., the PCB 12, the DM 13, the TSP 14, etc.). Further, the housing 11 may further accommodate a battery 111 that supplies power to the mobile device 10.

The PCB 12 may include a fuel gauge integrated circuit (FGIC) 121 configured to measure a charge state, a power management integrated circuit (PMIC) 122 configured to supply power, an application processor (AP) 123 that processes multimedia data (e.g., an image or a moving picture) using an application program, a modulator-demodulator (MODEM) 124 configured to transfer and receive a data signal, and a display driver integrated circuit (DDI) 125 configured to drive the DM 13.

The DM 13 may display an image. In some embodiments, the DM 13 may include various display panels such as an organic light-emitting display panel, a liquid crystal display panel, a plasma display panel, an electrophoretic display panel, an electro-wetting display panel, etc.

The TSP 14 may receive a touch signal as an input method of the DM 13. In some embodiments, the TSP 14 may be embodied using an electrostatic capacitance type touch panel.

The window cover glass 15 is disposed on the TSP 14, and is combined with the housing 11 to form an external surface of the mobile device 10 together with the housing 11.

In some embodiments, the mobile device 10 may further include various other components such as a memory unit (e.g., volatile memory/non-volatile memory) that stores data, a microphone, a speaker, and an audio processor, etc.

Figure 2:
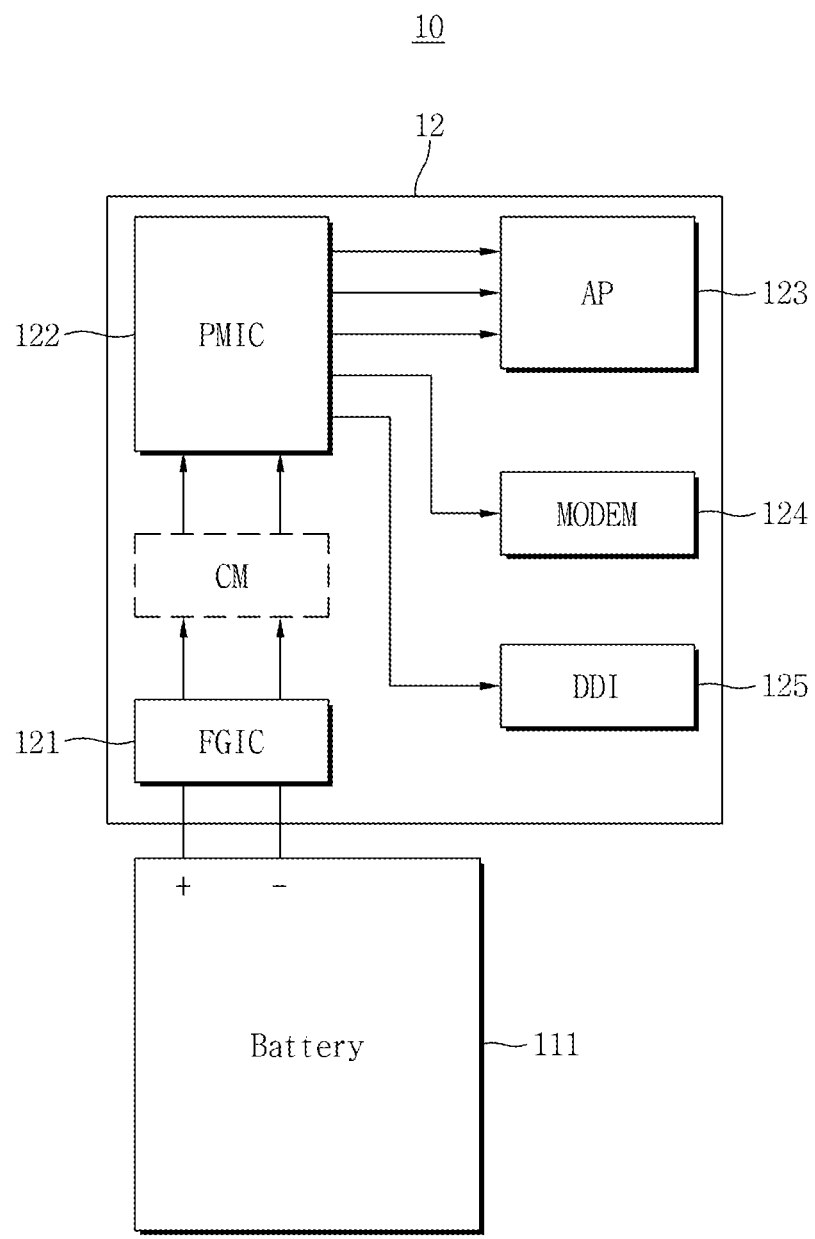
FIG. 2 is a block diagram illustrating the mobile device shown in FIG. 1 in detail.

FIG. 2 is a block diagram illustrating the mobile device 10 shown in FIG. 1 in detail.

Referring to FIGS. 1 and 2, the battery 111 supplies a power source to the mobile device 10. The battery 111 is connected to the FGIC 121. The FGIC 121 may measure a charge state of the battery 111. Specifically, the FGIC 121 may precisely measure a current, a voltage, and a temperature to determine the charge state of the battery 111. The battery 111 supplies the power source to the PMIC 122 through the FGIC 121.

When the mobile device 10 is not actively working/operating (e.g., not being actively used by a user), the PMIC 122 may change the mobile device 10 to a low power state or reduce power consumption of the mobile device 10. Further, the PMIC 122 may supply the power source to a variety of electronic components mounted on the PCB 12. For example, the PMIC 122 supplies the power source having many different voltage levels to the AP 123. Further, the PMIC 122 supplies the power source to the MODEM 124 and the DDI 125.

To measure real-time power consumption, a current meter CM may be installed between the FGIC 121 and the PMIC 122. The current meter CM may further include a mean power calculator configured to calculate real-time power consumption as a mean value according to time duration.

Further, the AP 123, according to various embodiments of present inventive concepts, may receive the real-time power consumption measured in the current meter CM to calculate the mean power according to the time duration.

Meanwhile, the PMIC 122 may include a current meter CM configured to measure power consumption of an input terminal and an output terminal in the PMIC 122 to measure real-time power consumption. The PMIC 122 including the current meter CM is described in further detail with respect to FIG. 3.

Figure 3:
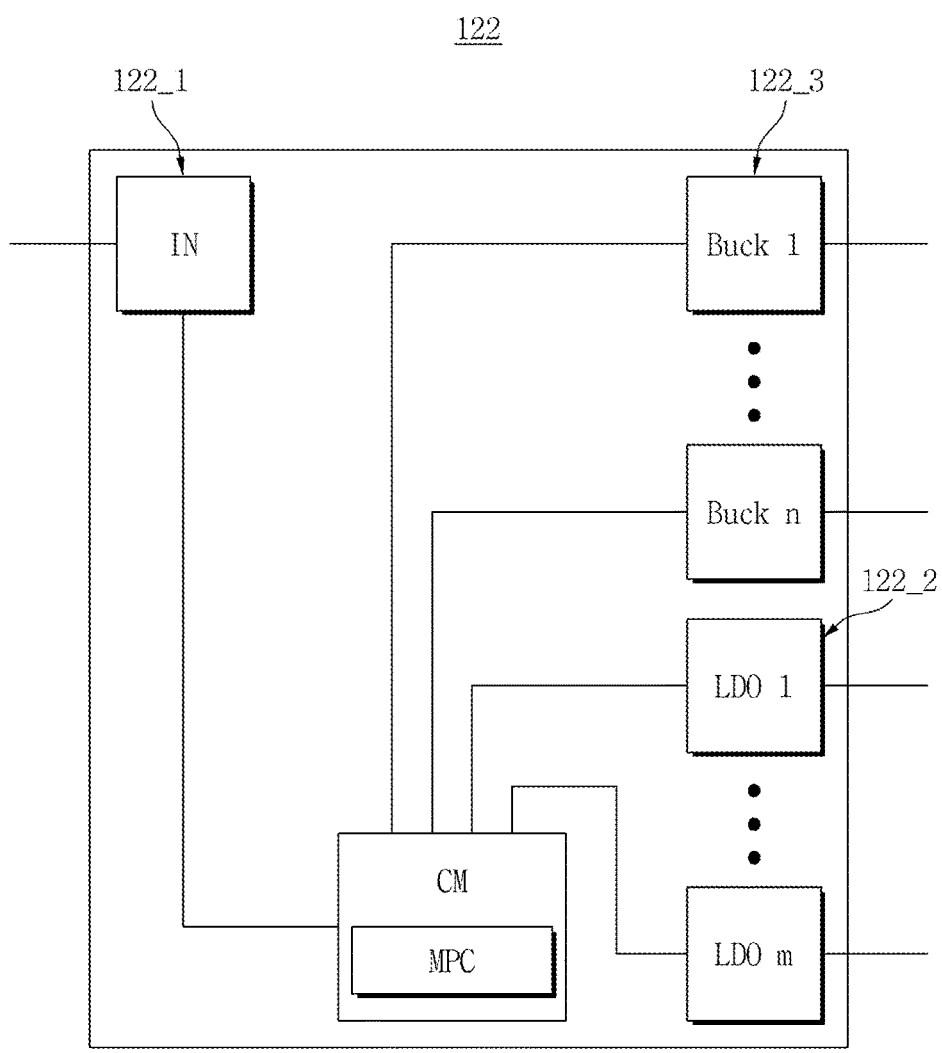
FIG. 3 is a block diagram illustrating a PMIC shown in FIG. 2.

FIG. 3 is a block diagram illustrating the PMIC shown in FIG. 2. Referring to FIGS. 2 and 3, to measure real time power consumption, the PMIC 122 includes a current meter CM configured to measure power consumption in an input terminal and an output terminal in the PMIC 122. The current meter CM may measure a total input current that is input from the battery 111.

The PMIC 122 includes an input port 122_1, at least one low dropout (LDO) regulator 122_2, at least one buck regulator 122_3, and a current meter CM.

The LDO regulator 122_2 may be used when a voltage drop of an output voltage is less than an input voltage. The buck regulator 122_3 may generate a lower output voltage than the input voltage.

The current meter CM may measure real-time power consumption of each of the input port 122_1, the LDO regulator 122_2, and the buck regulator 122_3. Further, the current meter CM may include a mean power calculator MPC configured to receive real power consumption according to time duration to calculate mean power.

Figure 4:
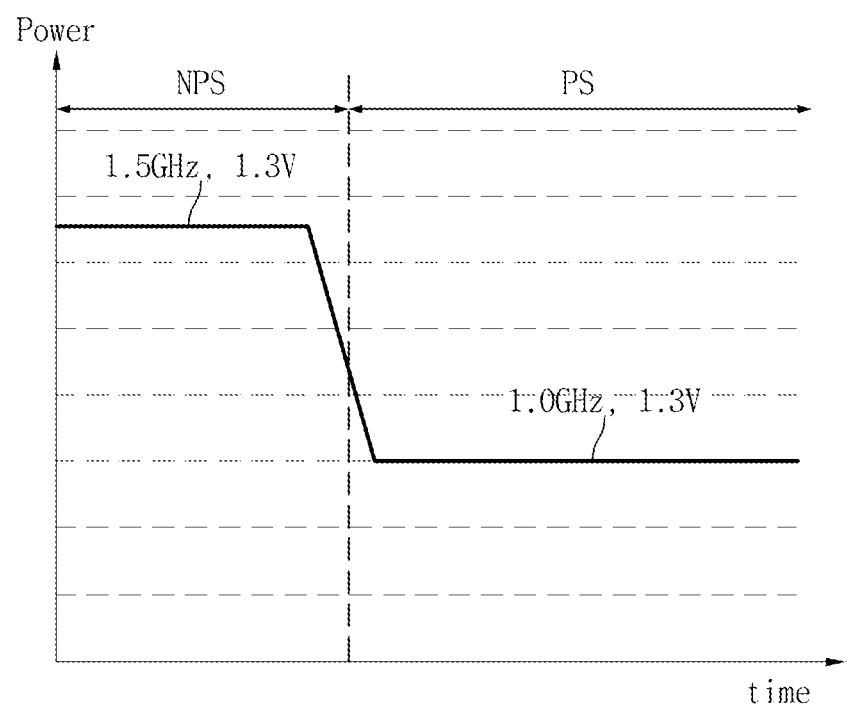
FIG. 4 is a graph illustrating an operation of a conventional mobile device.

FIG. 4 is a graph illustrating an operation of a conventional mobile device. Referring to FIGS. 2 and 4, an abscissa (e.g., a horizontal axis) indicates time and an ordinate (e.g., a vertical axis) indicates consumed power.

During a non-power-saving NPS mode, the AP 123 operates at the maximum operating frequency and the maximum operating voltage to maintain the maximum performance. In some embodiments, the AP 123 may operate at 1.5 Gigahertz (GHz) and 1.3 Volts (V).

During a power-saving PS mode, the AP 123 operates uniformly at a lower operating frequency than the maximum operating frequency, to save power of the battery 111. In some embodiments, the AP 123 may operate at 1.3 V and 1.0 GHz.

To save power of the battery 111, the AP 123 may use a dynamic voltage and frequency scaling (DVFS) technique.

In a conventional mobile device, an AP 123 may uniformly constrain the maximum operating voltage or the maximum operating frequency or operate in a power-saving mode using a lowered screen brightness or turning off haptic feedback.

When performing an operation requiring/benefiting from instantaneous high performance, such as a moving picture, a game, etc., one problem is that decreasing reactivity may occur. For example, the operating speed of an operating program may decrease or a motion on a screen may become unnatural.

Various embodiments of present inventive concepts, however, do not uniformly perform/provide performance constraints such as constraining the maximum operating frequency, lowering/reducing the screen brightness, turning off haptic feedback, etc. A method of driving the AP 123 according to various embodiments of present inventive concepts may constrain performance according to (e.g., with respect to) time duration. The method of driving the AP 123 that constrains performance according to time duration is described in further detail with respect to FIG. 5. Moreover, the inventive entity appreciates that operations herein of constraining performance may additionally or alternatively be referred to as "limiting" or "restricting" performance.

A user interface of a mobile device 10 may provide an option capable of controlling a power-saving mode in analog. Further, the user interface of a mobile device 10 may include an option capable of controlling the power-saving mode in analog using information on a charge state of a battery.

Figure 5:
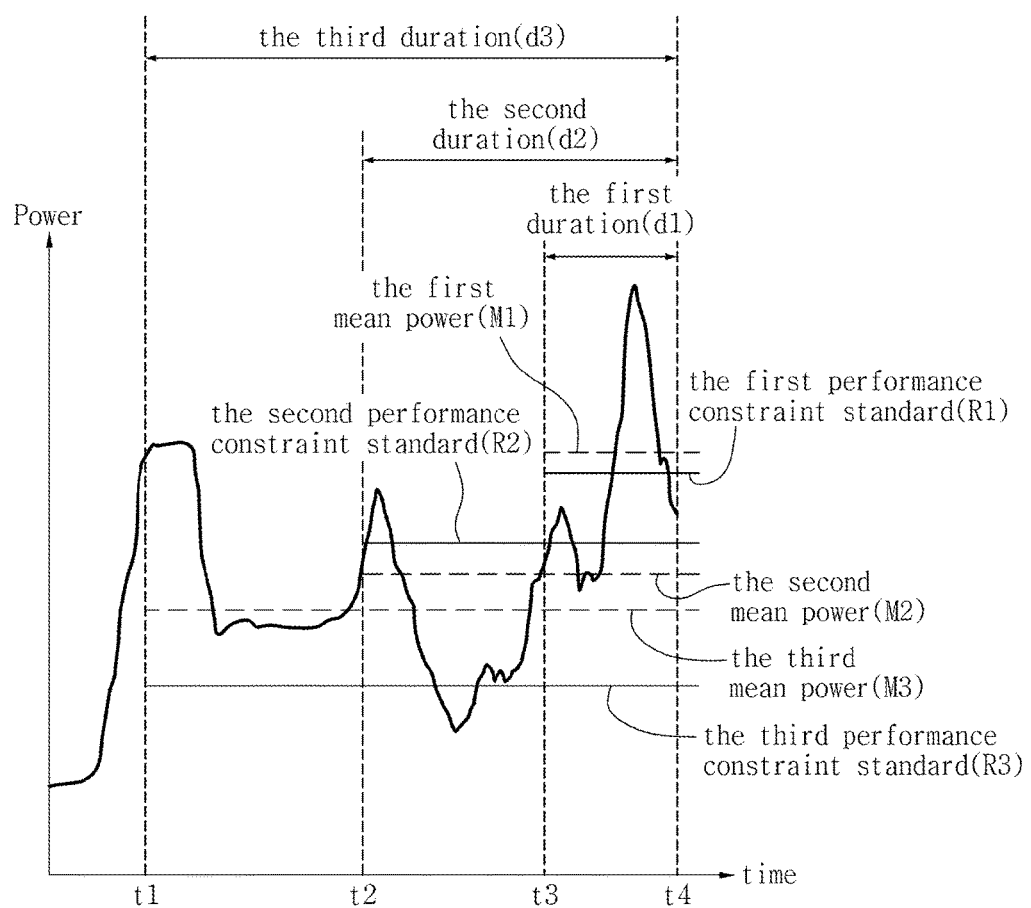
FIG. 5 is a graph illustrating real time power consumption of a mobile device according to various embodiments of present inventive concepts.

FIG. 5 is a graph illustrating real time power consumption of the mobile device 10 according to various embodiments of present inventive concepts. Referring to FIGS. 2 and 5, an abscissa (e.g., a horizontal axis) indicates time and an ordinate (e.g., a vertical axis) indicates consumed power.

A first duration d1 is set from t3 time to t4 time. A second duration d2 is set from t2 time to t4 time. And, a third duration d3 is set from t1 time to t4 time. For example, the first duration d1 may be set to 10 seconds, the second duration d2 may be set to 30 seconds, and the third duration d3 may be set to 1 minute. Although the time duration is divided by the first to third durations d1 to d3, it is not limited thereto.

The first mean power M1 is consumed mean power during the first duration d1. The second mean power M2 is consumed mean power during the second duration d2. The third mean power M3 is consumed mean power during the third duration d3.

Each of the first to third performance constraint standards R1 to R3 may have a different performance constraint standard from the others. For example, the first performance constraint standard R1 may be a standard that constrains performance of the mobile device 10 in the first duration d1. The second performance constraint standard R2 may be a standard that constrains performance of the mobile device 10 in the second duration d2 Likewise, the third performance constraint standard R3 may be a standard that constrains performance of the mobile device 10 in the third duration d3. Each of the first to third performance constraint standards R1 to R3 may be set (e.g., optimally set) using a simulation.

When the first mean power M1 exceeds the first performance constraint standard R1 in the first duration d1, the AP 123 may control power consumption of the mobile device 10. Accordingly, the power consumption is lower than the first performance constraint standard R1. A method of controlling the power consumption is described in further detail with respect to FIG. 9.

Further, when the second mean power M2 exceeds the second performance constraint standard R2 in the second duration d2, the AP 123 may control power consumption of the mobile device 10. Accordingly, the power consumption is lower than the second performance constraint standard R2.

Likewise, when the third mean power M3 exceeds the third performance constraint standard R3 in the third duration d3, the AP 123 may control power consumption of the mobile device 10. Accordingly, the power consumption is lower than the third performance constraint standard R3.

In the present disclosure, the AP 123 according to various embodiments of present inventive concepts may save power consumption of the mobile device 10 without reducing reactivity.

Figure 6:
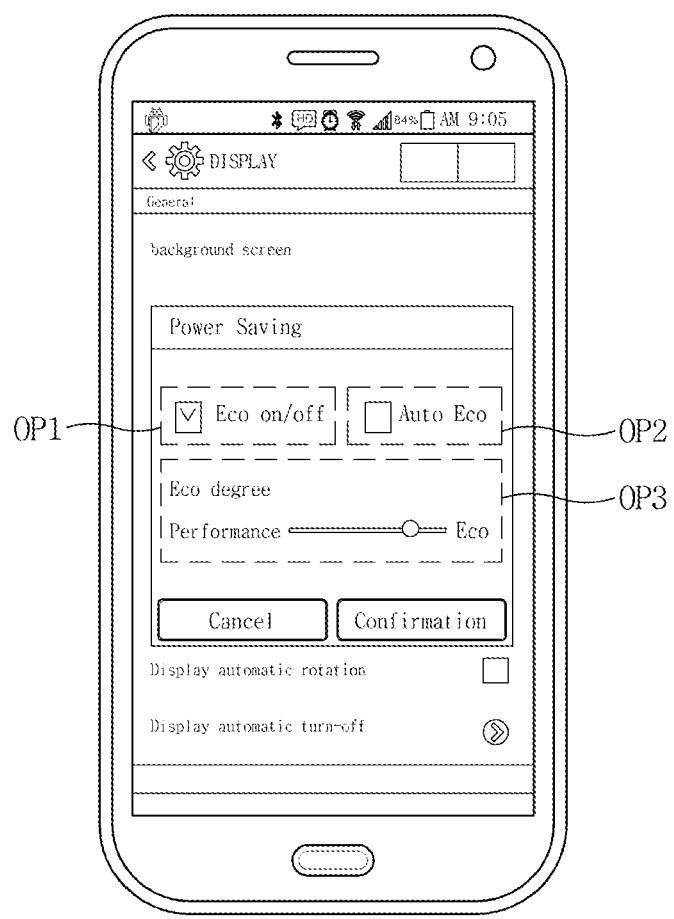
FIG. 6 shows a user interface of a mobile device according to various embodiments of present inventive concepts.

FIG. 6 shows a user interface of the mobile device 10 according to various embodiments of present inventive concepts. Referring to FIGS. 2 and 6, a user may select an eco power-saving mode through a user interface of the mobile device 10. The eco power-saving mode includes the first option OP1 as an eco on/off check box, the second option OP2 as an automatic eco check box, and the third option OP3 as an eco degree slider capable of selecting either a performance-based operation or a power-saving-based operation in an analog manner. For example, a user can select the degree to which the eco power-saving mode is (a) performance-based versus (b) eco-based (e.g., power-saving-based), using the slider.

When a user does not select the first option OP1, the second and third options OP2 and OP3 are in inactive states. When a user selects the second option OP2, the AP 123 according to various embodiments of present inventive concepts may control power consumption according to time duration. The third option OP3 is described in further detail with respect to FIGS. 7A to 7C.

Figure 7A:
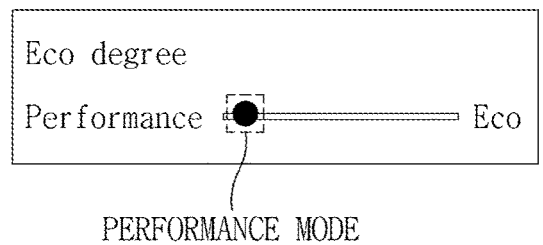
FIGS. 7A to 7C show a third option OP3 shown in FIG. 6 in detail.
Figure 7B:
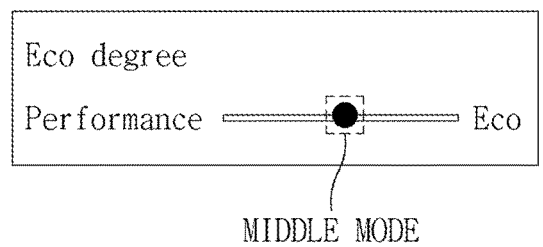
Figure 7C:
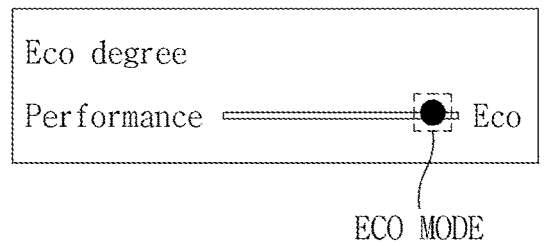

FIGS. 7A to 7C show in detail the third option OP3 that is shown in FIG. 6.

Referring to FIG. 7A, a user may select the third option OP3 in consideration of performance of a mobile device 10. That is, the user may set the third option OP3 to a performance mode.

Referring to FIG. 7B, the user may select the third option OP3 in consideration of both performance and power-saving of the mobile device 10. That is, the user may set the third option OP3 to a middle (e.g., balanced) mode. Further, the user may select the third option OP3 in further consideration of either the performance or power-saving of the mobile device 10.

Referring to FIG. 7C, the user may select the third option OP3 in consideration of saving power of the mobile device 10. That is, the user may set the third option OP3 to an eco mode.

FIG. 8 is a table illustrating a performance constraint standard according to the third option OP3 shown in FIGS. 7A to 7C.

Referring to FIGS. 2, 7A to 7C, and 8, the user may determine/select whether the mobile device 10 operates based on performance, power-saving, or both performance and power-saving.

For example, when the third option OP3 is determined/selected based on performance, the short-term maximum mean power (i.e., performance constraint standard) may be set to 6.0 Watts (W), the mid-term maximum mean power may be set to 2.5 W, and the long-term maximum mean power may be set to 2.0 W.

Further, when the third option OP3 is determined based on both (i) performance and (ii) power-saving, the short-term maximum mean power may be set to 5.0 W, the mid-term maximum mean power may be set to 2.0 W, and the long-term maximum mean power may be set to 1.0 W.

Moreover, when the third option OP3 is determined based on power-saving (e.g., based on an eco mode that is more eco-focused than performance-focused), the short-term maximum mean power may be set to 4.0 W, the mid-term maximum mean power may be set to 1.8 W, and the long-term maximum mean power may be set to 0.8 W.

Figure 9:
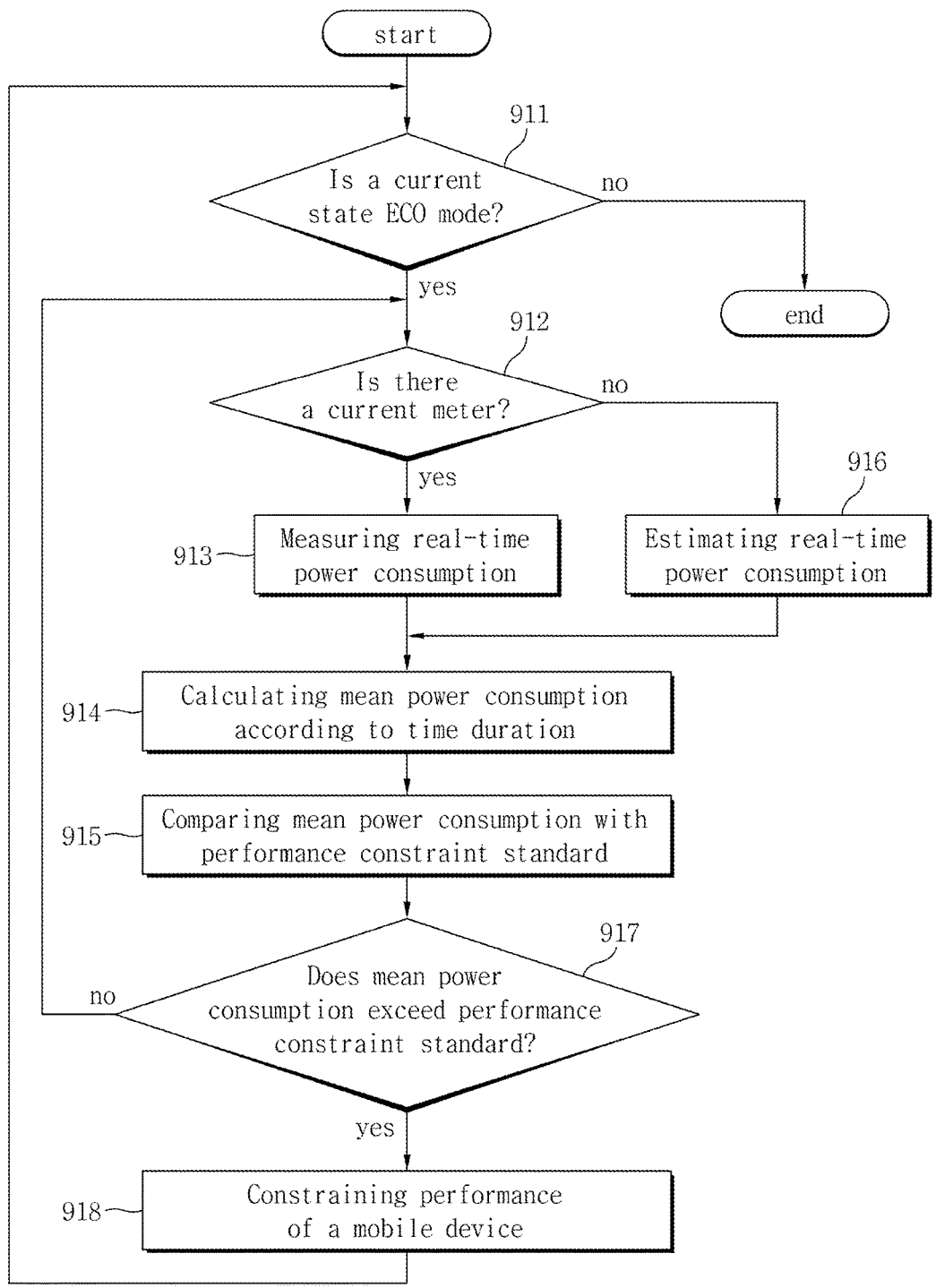
FIG. 9 is a flowchart illustrating a method of driving/operating an application processor, according to various embodiments of present inventive concepts.

FIG. 9 is a flowchart illustrating a method of driving/operating the AP 123, according to various embodiments of present inventive concepts. Referring to FIGS. 2 and 9, in operation 911, the AP 123 determines whether a current state is in an eco mode. For example, when a user selects the eco mode as/via the third option OP3 through a user interface of a mobile device 10, the AP 123 may control performance according to the table shown in FIG. 8.

In operation 912, when there is a current meter CM in the mobile device 10, operations 913 to 915 are performed. Otherwise, operation 916 is performed, and operations 914 and 915 are performed. That is, when the current meter CM is in the mobile device 10, the current meter CM measures power consumption in real time. Otherwise, when the current meter CM is not in the mobile device 10, the AP 123 estimates the power consumption in real time. The PMIC 122, the current meter CM, and/or the AP 123 may be referred to herein as "processing circuitry," which may include one or more processors.

In operation 913, the current meter CM measures the power consumption in real time.

In operation 914, a mean power calculator MPC calculates mean power consumption according to (e.g., with respect to) a time duration. For example, the mean power calculator MPC may determine the average power consumption of the mobile device 10 during a particular time period. Further, the AP 123 may calculate mean power consumption according to a time duration when the mobile device 10 does not include the mean power calculator MPC. As described herein, the PMIC 122 (e.g., including the mean power calculator MPC), the current meter CM, and/or the AP 123 may be referred to herein as "processing circuitry," which may include one or more processors.

In operation 915, the AP 123 compares the performance constraint standard with the mean power consumption according to time duration.

In operation 916, when the mobile device 10 does not include the current meter CM, the AP 123 estimates power consumption in real-time. That is, the AP 123 may estimate the power consumption using an associative relationship based on consumption of electrical power, an operational (e.g., operating) frequency, capacitance, and the like in each component. For example, power consumption in a central processing unit (CPU), a memory interface, and a graphics processing unit (GPU) is proportional to an operational frequency, a capacitance of a load, and square of a provided voltage. Accordingly, the power consumption may be estimated using the below Equation 1. At this time, coefficients A and B may be set in consideration of the associative relationship based on the power consumption, the operational frequency and the capacitance of a load, etc.

power consumption=$A$×operating frequency×capacitance of a load+$B$×(operating voltage)$^2$   Equation 1:

Further, power consumption is proportional to a resolution, a data transaction, and illumination in a liquid crystal display (LCD) interface. Accordingly, the power consumption may be estimated according to the below Equation 2.

power consumption=$A$×resolution+$B$×amount of data transaction+$C$×illumination   Equation 2:

The coefficients A, B, and C may be set in consideration of the resolution, the amount of data transaction, the illumination, etc.

In operation 914, the AP 123 calculates mean power consumption according to time duration using the estimated real-time power consumption. Further, in operation 915, the AP 123 compares the mean power consumption according to the time duration with the performance constraint standard.

In operation 917, the AP 123 determines whether the mean power consumption according to the time duration exceeds the performance constraint standard. When it exceeds, the AP 123 constrains (in operation 918) performance of the mobile device 10.

For example, the AP 123 lowers the maximum operating frequency or the maximum operating voltage of the CPU or the GPU, or controls a state of a modulator-demodulator (MODEM), a back light of a DDI, illumination, etc.

Figures 10, 11:
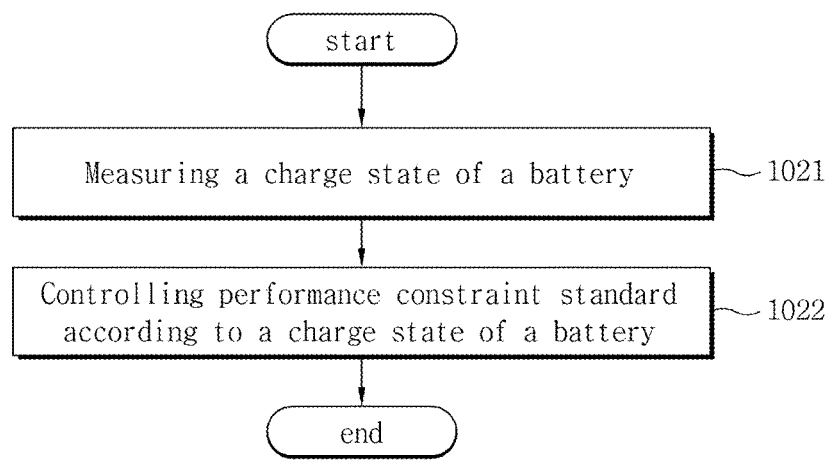
FIG. 10 is a flowchart illustrating control of a performance constraint standard according to a charge state of a battery, according to various embodiments of present inventive concepts.
FIG. 11 is a table illustrating a performance constraint standard according to a charge state of a battery, according to various embodiments of present inventive concepts.

FIG. 10 is a flow chart illustrating control of a performance constraint standard according to a charge state of a battery.

Referring to FIGS. 2 and 10, the AP 123 according to various embodiments of present inventive concepts may control a performance constraint standard according to (e.g., in response to) a charge state of a battery.

Operation 1021 includes measuring a charge state of a battery.

Operation 1022 includes controlling a performance constraint standard according to the measured charge state of the battery or time duration.

FIG. 11 is a table illustrating a performance constraint standard according to a charge state of a battery. Referring to FIGS. 2 and 11, when the charge state of the battery 111 is 100%, the short-term maximum mean power (i.e., performance constraint standard) may be set to 6.0 W, the mid-term maximum mean power may be set to 2.5 W, and the long-term maximum mean power may be set to 2.0 W.

Further, when the charge state of the battery 111 is 50%, the short-term maximum mean power may be set to 5.0 W, the mid-term maximum mean power may be set to 2.0 W, and the long-term maximum mean power may be set to 1.0 W.

Moreover, when the charge state of the battery 111 is 30%, the short-term maximum mean power may be set to 4.0 W, the mid-term maximum mean power may be set to 1.8 W, and the long-term maximum mean power may be set to 0.8 W.

Figure 12:
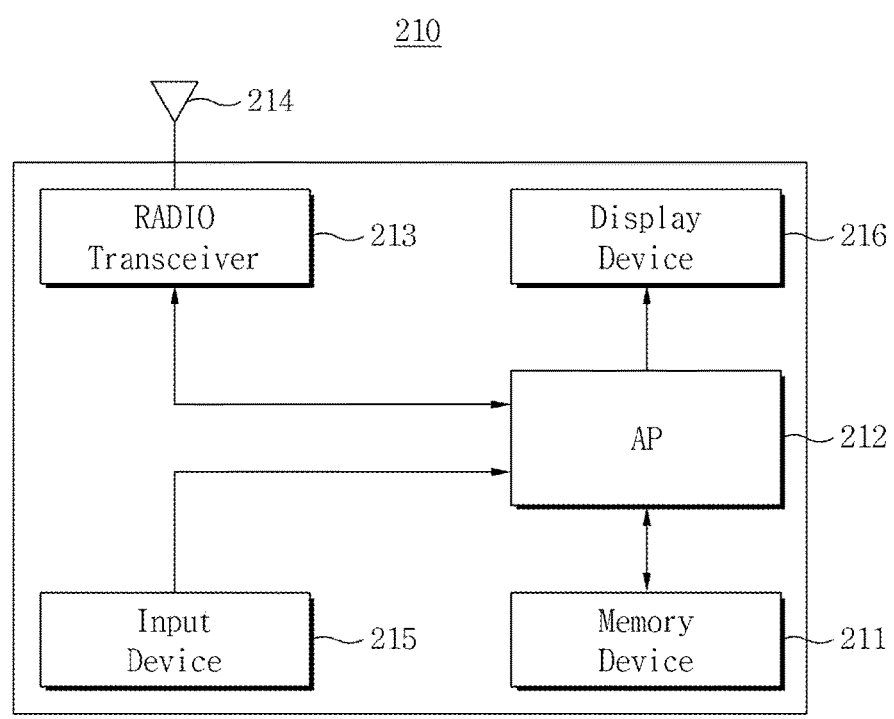
FIG. 12 is a block diagram illustrating a computer system including the application processor shown in FIG. 1, according to various embodiments of present inventive concepts.

FIG. 12 is a block diagram illustrating a computer system including the AP 123 shown in FIG. 1, according to various embodiments of present inventive concepts. Referring to FIG. 12, a computer system 210 includes a memory device 211, an AP 212 including a memory controller configured to control the memory device 211, a radio transceiver 213, an antenna 214, an input device 215, and a display device 216.

The radio transceiver 213 may transmit and receive a radio signal through the antenna 214. For example, the radio transceiver 213 may convert the radio signal received through the antenna 214 into a signal to be processed in the AP 212.

Accordingly, the AP 212 may process a signal output from the radio transceiver 213, and transmit the processed signal to the display device 216. Further, the radio transceiver 213 may convert a signal output from the AP 212 into a radio signal, and transmit the converted radio signal to an external device through the antenna 214.

The input device 215 is a device configured to input a control signal that controls an operation of the AP 212 or data to be processed by the AP 212, and may be embodied in a pointing device (such as a touchpad or a computer mouse), a keypad, or a keyboard.

In some embodiments, the AP 212 may be embodied in the AP 123 shown in FIG. 1.

Figure 13:
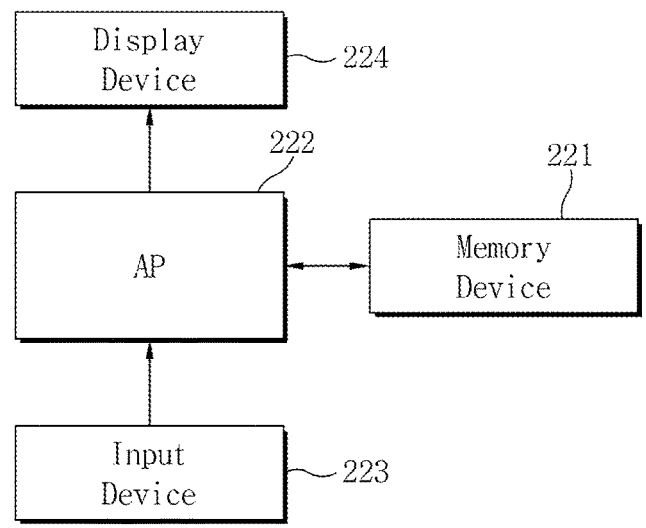
FIG. 13 is a block diagram illustrating a computer system including the application processor shown in FIG. 1, according to various embodiments of present inventive concepts.

FIG. 13 is a block diagram illustrating a computer system including the application processor 123 shown in FIG. 1, according to various embodiments of present inventive concepts.

Referring to FIG. 13, a computer system 220 may be embodied in a computer (e.g., a personal computer (PC)), a network server, a tablet computer (e.g., a tablet PC), a netbook, an e-reader, a personal digital assistant (PDA), a portable multimedia player (PMP), an MP3 player, or an MP4 player.

The computer system 220 includes a memory device 221, an AP 222 including a memory controller configured to control a data processing operation of the memory device 221, an input device 223, and a display device 224.

The AP 222 displays data stored in the memory device 221 through the display device 224 according to data input through the input device 223. For example, the input device 223 may be embodied in a pointing device (such as a touchpad or a computer mouse), a keypad, or a keyboard.

The AP 222 controls overall operations of the computer system 220 and operations of the memory device 221.

In some embodiments, the AP 222 may be embodied in the AP 123 shown in FIG. 1.

Figure 14:
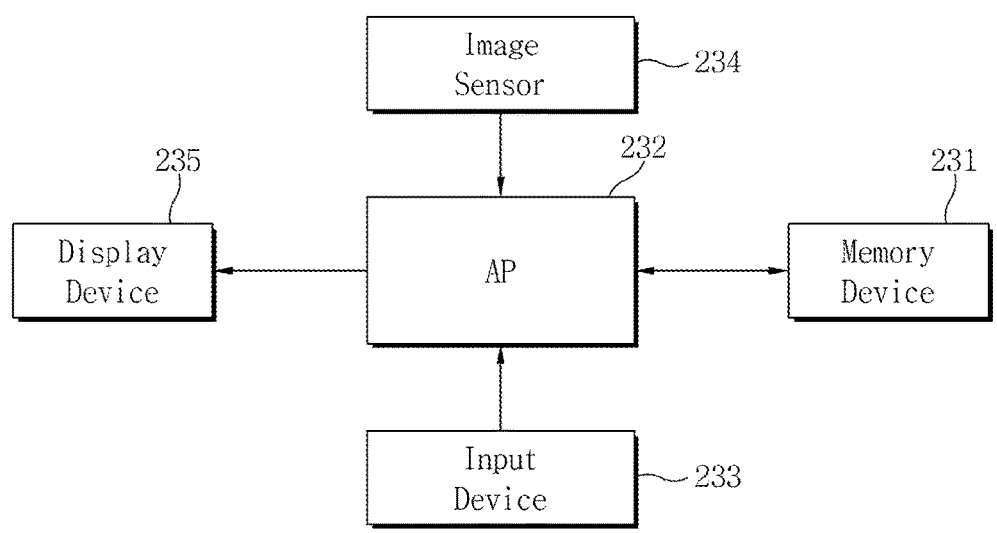
FIG. 14 is a block diagram illustrating a computer system including the application processor shown in FIG. 1, according to various embodiments of present inventive concepts.

FIG. 14 is a block diagram illustrating a computer system including the AP 123 shown in FIG. 1, according to various embodiments of present inventive concepts.

Referring to FIG. 14, a computer system 230 may be embodied in an image processing device, such as, for example, a digital camera or a mobile phone having the digital camera, a smartphone, or a tablet computer (e.g., a tablet PC).

The computer system 230 further includes a memory device 231, an AP 232 including a memory controller configured to control a data processing operation, such as, for example, a write operation or a read operation of the memory device 231, an input device 233, an image sensor 234, and a display device 235.

The image sensor 234 of the computer system 230 converts an optical image to digital signals, and the converted digital signals are transmitted to the AP 232. According to the control of the AP 232, the converted digital signals may be displayed through the display device 235, or stored in the memory device 231.

Further, the data stored in the memory device 231 is displayed through the display device 235 according to the control of the AP 232.

The input device 233 is a device configured to input a control signal that controls an operation of the AP 232 or data to be processed by the AP 232, and may be embodied in a pointing device (such as a touchpad and a computer mouse), a keypad, or a keyboard.

In some embodiments, the AP 232 may be embodied in the AP 123 shown in FIG.

A method of driving the application processor according to various embodiments of present inventive concepts can minimize/impede the reduction of operational speed, to maintain reactivity when a program requires/benefits from instantaneous high performance in a power-saving mode.

Various embodiments of present inventive concepts can be applied to a mobile device, a computer system, or any other wireless electronic device, that has an application processor.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A method of operating a mobile device, the method comprising:

receiving an analog selection with respect to a performance-based operation and a power-saving-based operation of the mobile device through a user interface, and adjusting each of a first performance constraint standard value, a second performance constraint standard value, and a third performance constraint standard value, based on the analog selection;

measuring power consumption of the mobile device in real-time, using a current meter to provide a measured power consumption, or estimating the power consumption in real-time to provide an estimated power consumption;

calculating, by a processor, a mean power consumption of each of a first time duration, a second time duration, and a third time duration, using the measured power consumption or using the estimated power consumption;

comparing, by the processor, the first performance constraint standard value with the mean power consumption of the first time duration, the second performance constraint standard value with the mean power consumption of the second time duration, and the third performance constraint standard value with the mean power consumption of the third time duration; and non-uniformly constraining, by the processor, performance of the mobile device in each of the first through third time durations, based on the comparing.

2. The method of claim 1, wherein the second time duration comprises the first time duration;

the third time duration comprises the second time duration; and the second performance constraint standard value is lower than the first performance constraint standard value and higher than the third performance constraint standard value.

3. The method of claim 2, wherein the non-uniformly constraining comprises:

constraining short-term power consumption of the mobile device using the first performance constraint standard value;

constraining mid-term power consumption of the mobile device using the second performance constraint standard value; and constraining long-term power consumption of the mobile device using the third performance constraint standard value.

4. The method of claim 1, wherein the mobile device comprises a battery; and the adjusting of each of the first through third performance constraint standard values comprises adjusting the first through third performance constraint standard values, further based on a charge state of the battery.

5. The method of claim 4, wherein the adjusting of each of the first through third performance constraint standard values further comprises:

comparing a battery power level of the battery with each of different first through third level values; and adjusting the first through third performance constraint standard levels, based on the comparing of the battery power level with each of the first through third level values.

6. The method of claim 1, wherein the non-uniformly constraining of the performance of the mobile device comprises controlling at least one of an amount of current provided from a battery, an operating frequency of the processor, and brightness of a display in the mobile device, in the first through third time durations.

7. The method of claim 1, further comprising:

determining whether the mobile device includes the current meter; and wherein the providing of the power consumption comprises, measuring power consumption of the mobile device in real-time using the current meter in response to determination that the mobile device includes the current meter, and estimating power consumption of the mobile device in real-time in response to determination that the mobile device does not include the current meter.

8. The method of claim 7, wherein the estimating comprises estimating the power consumption of the mobile device in real-time using at least one of an operating frequency of the processor and a capacitance of a load of the mobile device.

9. A method of operating a mobile device including a battery, the method comprising:

comparing a battery power level of the battery with each of different first through third level values;

adjusting each of first through third performance constraint standard values, based on the comparing;

measuring power consumption of the mobile device in real-time, using a current meter to provide a measured power consumption, or estimating the power consumption in real-time to provide an estimated power consumption;

calculating a first mean power consumption based on one of the measured power consumption and the estimated power consumption with respect to a first time duration, and constraining performance of the mobile device, based on comparison between the first mean power consumption and the first performance constraint standard value;

calculating a second mean power consumption based on one of the measured power consumption and the estimated power consumption with respect to a second time duration, and constraining the performance of the mobile device, based on comparison between the second mean power consumption and the second performance constraint standard value; and calculating a third mean power consumption based on one of the measured power consumption and the estimated power consumption with respect to a third time duration, and constraining performance of the mobile device, based on comparison between the third mean power consumption and the third performance constraint standard value.

10. The method of claim 9, wherein the second level value is lower than the first level value and higher than the third level value; and the second performance constraint standard value is lower than the first performance constraint standard value and higher than the third performance constraint standard value.

11. The method of claim 9, wherein the mobile device further includes a user interface; and the method further comprises receiving an analog selection with respect to a performance-based operation and a power-saving-based operation of the mobile device through the user interface.

12. The method of claim 11, wherein the adjusting of each of the first through third performance constraint standard values comprises adjusting each of the first through third performance constraint standard values further based on the analog selection.

13. The method of claim 9, wherein the constraining of the performance of the mobile device, based on comparison between the first mean power consumption and the first performance constraint standard value comprises, when the first mean power consumption is equal to or greater than the first performance constraint standard value, limiting at least one of an amount of current provided from the battery, an operating frequency of the mobile device, haptic feedback of the mobile device, and brightness of a display of the mobile device.

14. The method of claim 9, wherein the providing of the power consumption comprises:

determining whether the mobile device includes the current meter;
measuring power consumption of the mobile device in real-time using the current meter in response to determination that the mobile device includes the current meter; and
estimating power consumption of the mobile device in real-time in response to determination that the mobile device does not include the current meter.

15. The method of claim 14, wherein the estimating comprises estimating the power consumption of the mobile device in real-time using at least one of an operating frequency, an operating voltage, and a capacitance of a load of the mobile device.

16. The method of claim 9, wherein the constraining of the performance of the mobile device, based on the comparison between the first mean power consumption and the first performance constraint standard value comprises constraining short-term power consumption of the mobile device, based on the comparison between the first mean power consumption and the first performance constraint standard value.

17. A mobile device comprising:
a battery;
a memory having computer-readable instructions stored therein;
a user interface configured to provide an option for receiving an analog selection with respect to a performance-based operation and a power-saving-based operation of the mobile device; and
a processor configured to execute the computer-readable instructions to,
adjust each of a first performance constraint standard value, a second performance constraint standard value, and a third performance constraint standard value, based on the analog selection;
receive power consumption of the mobile device in each of first through third time durations;
compare the first performance constraint standard value with the power consumption of the first time duration, the second performance constraint standard value with the power consumption of the second time duration, and the third performance constraint standard value with the power consumption of the third time duration; and
constrain performance of the mobile device in each of the first through third time durations, based on the comparison.

18. The mobile device of claim 17, wherein the processor is further configured to execute the computer-readable instructions to:
receive a battery power level of the battery; and
adjust the first through third performance constraint standard values, based on comparison between the battery power level of the battery with each of different first through third level values.

19. The mobile device of claim 17, further comprising:
a display device; and
wherein the processor comprises an application processor that is configured to limit at least one of an amount of current provided from the battery, an operating frequency of the mobile device, and a brightness of the display device, based on the comparison.

20. The mobile device of claim 17, wherein
the second time duration comprises the first time duration;
the third time duration comprises the second time duration; and
the second performance constraint standard value is lower than the first performance constraint standard value and higher than the third performance constraint standard value.

* * * * *